Aug. 26, 1958  R. A. BROCKBANK  2,849,526
SUBMARINE CABLE
Filed Aug. 12, 1952
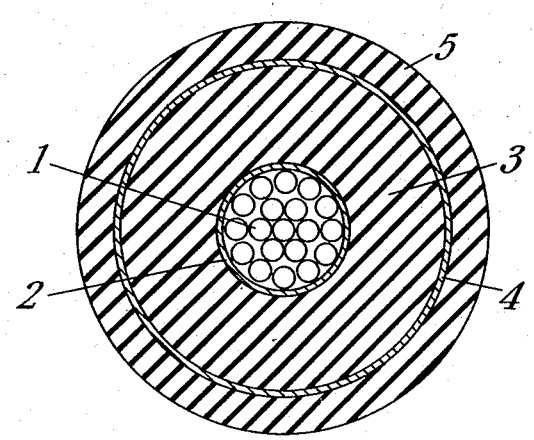
Robert A. Brockbank,
INVENTOR
by Hall + Houghton
Attorney

United States Patent Office 2,849,526
Patented Aug. 26, 1958

2,849,526

SUBMARINE CABLE

Robert Alston Brockbank, Kenton, England

Application August 12, 1952, Serial No. 303,880

Claims priority, application Great Britain August 16, 1951

5 Claims. (Cl. 174—107)

This invention relates to submarine cables and in particular to submarine cables laid in deep water. It is an object of the invention to provide an improved type of submarine cable.

It is customary for submarine cables laid in shallow water to be provided with external steel-wire armour to protect the cable against trawls, anchors, abrasive action due to currents etc. It is also customary to use a similar type of armouring for cables laid in deep seas or oceans but in this case the armouring is generally required in order to take the stress of laying and recovering the cable. As the depth increases there becomes less and less need for external protection and more and more need for a cable with a high tensile strength. For example it is well-known to design a deep water cable with a modulus of from 5 to 8 nautical miles, that is, it will support this length of its own weight when immersed in sea water. It is this type of cable with which the invention is primarily concerned.

A deep water cable with external wire armouring suffers from several disadvantages. For example, since the wires corode to a greater or less extent in various localities, the minimum weight of armour which must be applied to a cable is usually determined by the minimum diameter of wire sufficient to maintain strength over a period of years and the need for reasonable filling of armour around the circumference of the cable. This weight may be unnecessarily large in certain applications. Also a single wire armoured cable unlays under tension and in deep water the resultant twists which can be introduced into the cable make the cable particularly liable to kink which leads to subsequent failure. This effect is aggravated if repeaters are inserted into the cable. Also chiefly by the reason of the extension of an armoured cable under tension a phenomenon known as "knuckling" can occur whereby the inner conductor is forced through the armour.

It is an object of the present invention to eliminate and greatly minimize these disadvantages and at the same time to provide a much less costly cable.

According to the present invention a submarine cable has a multi-layer body of steel wires located at or near the centre of the cable which provides the tensile strength required of the cable, the strands being placed in at least two layers so that the several strands can be arranged so that little or no twist occurs when the cable is subjected to tension.

In a coaxial cable constructed in accordance with the invention and intended for carrier frequency transmission an inner conductor in the form of a layer of copper tape surrounds the steel core. The outer conductor of the cable preferably consists of a layer of aluminium conveniently applied in tape form outside the dielectric surrounding the inner conductor. Since when immersed in water aluminum for a given bulk has less than one quarter of the weight of copper, it will, in general, be found that the use of an aluminium outer conductor results in a more economical cable to meet a given attenuation coefficient, modulus and breaking strength.

In the accompanying drawing of an exemplary embodiment of the invention the single figure is a more or less diagrammatic enlarged cross-section through a coaxial submarine cable embodying the invention.

In general, the separate steps employed in making the cable are in accordance with known practice and known manufacturing procedure can be adopted.

Referring to the figure of the accompanying drawings, a coaxial submarine cable to transmit signals in the frequency range of 12 kc./s. to 240 kc./s. consists of a multiwire core 1 composed of nineteen wires all of the same diameter and of high tensile strength steel. The wires are arranged so that an inner layer of six wires surrounds a central wire and the inner layer is itself covered by an outer layer of twelve wires with an opposite lay. The outer layers has a lay of about three times that of the inner layer and lays of 6 inches and 2 inches for the outer and inner layers respectively are satisfactory. This core whose overall diameter is 0.26 inch is surrounded by an inner conductor 2 of copper which consists of a single longitudinal tape 0.015 inch thick folded round the core with its edges abutting.

A layer 3 of suitable insulating material such as polyethylene is then formed over the cable to a diameter of 0.75 inch. An outer conductor 4 consisting of a layer of six aluminium tapes each 0.018 inch thick is then applied with a long lay.

Over the outer conductor is an outer covering 5 consisting of two layers of polyvinyl chloride tape and a layer of jute with compound applied over each layer. A suitable corrosion inhibitor such as barium chromate is applied either to the aluminium tapes or to the outer covering.

Alternatively, any suitable non-metallic material, such as extruded polyethylene, hessian, a plastic or textile material, could be used in place of the polyvinyl chloride tape and jute layers.

The cable was found to have a breaking load of 5½ tons and weighed about ½ and 1½ tons per nautical mile in water and air respectively, thus the cable has a modulus of about eleven nautical miles. In comparison, a normal single wire armoured cable having the same attenuation coefficient would weigh about 3 and 4½ tons per nautical mile in water and air respectively and have a modulus of about 7 nautical miles. It will be apparent that a substantial reduction in the weight and size of the cable has been effected thus resulting in a cheaper and more flexible cable without degrading the necessary electrical and mechanical requirements.

The high tensile steel wires may conveniently be of a carbon steel with a carbon content of about 0.6% with a tensile strength in wire form of 100–120 tons per square inch. The initial magnetic permeability of such steel is about 60 and the electrical resistivity is about thirteen times that of copper. Under conditions normally envisaged for operating a coaxial submarine cable there is no degradation of the system due to the presence of the magnetic steel core within the inner conductor even if, in general, the inner conductor is of a thickness very much less than the skin depth. For example, on the cable just described, third order distortion with one milliwatt of 3 kc./s. tone applied to the cable is less than −190 db relative to one milliwatt. In general an extensive variation is permissible in the electrical and magnetic properties of the steel and in the signal operating conditions on the cable.

Chiefly due to the fact that the extension of a cable constructed in accordance with the present invention is very much less than with a normal armoured cable under comparable tensile loading it has been found that under test "knuckling" does not occur.

It will be understood that alternative methods of constructing submarine cables according to the invention may be adopted. For example, a thin extruded sheath, i. e. a seamless tube, of aluminum may form the outer conductor, and other changes may be made in the construction without departing from the spirit or range of equivalency of the appended claims defining the scope of the invention.

I claim:

1. A submarine cable of the coaxial type for transmitting signals in the frequency range of 12 kilocycles per second to 240 kilocycles per second and having a breaking load of approximately 5½ tons and a weight of only about ½ and 1½ tons per nautical mile in water and air respectively, said cable having a modulus of approximately eleven nautical miles and being substantially free from knuckling; said cable comprising a stranded high tensile steel wire core that provides the tensile strength of the cable; said stranded steel core comprising 19 wires each approximately .05 inch in diameter, one of said wires being arranged centrally, six of said wires being wrapped on said one wire with a lay of one hand of approximately two inches, and twelve of said wires being wrapped about said six wires with a lay of the opposite hand and of approximately six inches; a conductor comprised of tape of about 0.015 inch thickness and of a width corresponding to the circumference of said core, said tape extending longitudinally of said core and being bent transversely thereabout and forming a longitudinal conductor sleeve embracing said core; a layer of polyethylene dielectric surrounding said conductor sleeve, said dielectric being of a thickness approximately equal to the diameter of said core; an outer conductor of aluminum approximately 0.02 inch thick surrounding said polyethylene dielectric; and a non-metallic outer covering surrounding said outer conductor and constituting the sole external covering of the submarine cable.

2. A coaxial submarine cable according to claim 1, said outer covering being formed of covering layers of a plastic material and jute with compound surrounding each cover layer.

3. A coaxial submarine cable for high frequency signalling consisting solely of a steel wire strength core having a plurality of layers of steel wires of opposite lay so that the core undergoes substantially no twisting under tension, the core constituting the sole tension sustaining element of the submarine cable; a metal conductor surrounding said core and extending longitudinally thereof in the form of a longitudinal sleeve and constituting the inner conductor of the coaxial submarine cable; a second longitudinally extending conductor sheath of substantially larger diameter than said first conductor and constituting the outer conductor of the submarine cable, said second conductor being metal of a thickness approximately that of said first conductor and being held concentric to said first conductor by interposed solid insulating material; and a non-metallic covering surrounding said second conductor and constituting the sole external covering of the submarine cable.

4. A coaxial submarine cable according to claim 3, said outer conductor being in the form of a seamless tube.

5. A coaxial submarine cable according to claim 3, said outer conductor being in the form of six aluminum strips, said strips being laid on said dielectric with a long lay.

References Cited in the file of this patent

UNITED STATES PATENTS

| | | |
|---|---|---|
| 327,487 | Spaulding | Sept. 29, 1885 |
| 327,489 | Spaulding | Sept. 29, 1885 |
| 896,700 | Atwood | Aug. 25, 1908 |
| 1,489,402 | Varney | Apr. 8, 1924 |
| 1,626,776 | Austin | May 3, 1927 |
| 1,821,887 | Fowle | Sept. 1, 1931 |
| 2,316,293 | Scott | Apr. 13, 1943 |
| 2,589,507 | Noyes | Mar. 18, 1952 |
| 2,711,439 | Smith | June 21, 1955 |

FOREIGN PATENTS

| | | |
|---|---|---|
| 340,261 | Great Britain | Dec. 23, 1930 |